(12) United States Patent
Jeong et al.

(10) Patent No.: US 11,515,549 B2
(45) Date of Patent: Nov. 29, 2022

(54) METHOD OF RECOVERING PERFORMANCE OF FUEL CELL STACK

(71) Applicants: HYUNDAI MOTOR COMPANY, Seoul (KR); KIA MOTORS CORPORATION, Seoul (KR)

(72) Inventors: Seong Cheol Jeong, Suwon-si (KR); Jong Gyun Kim, Yongin-si (KR); Dae Jong Kim, Yongin-si (KR); Jae Won Jung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 16/994,876

(22) Filed: Aug. 17, 2020

(65) Prior Publication Data

US 2021/0091395 A1 Mar. 25, 2021

(30) Foreign Application Priority Data

Sep. 24, 2019 (KR) .................. 10-2019-0117133

(51) Int. Cl.
*H01M 8/04* (2016.01)
*H01M 8/04537* (2016.01)
*H01M 8/04313* (2016.01)
*H01M 8/04014* (2016.01)

(52) U.S. Cl.
CPC ... *H01M 8/04559* (2013.01); *H01M 8/04014* (2013.01); *H01M 8/04313* (2013.01); *H01M 2250/20* (2013.01)

(58) Field of Classification Search
CPC ......... H01M 8/04014; H01M 8/04313; H01M 8/04559; B60L 50/70; B60L 50/75
USPC ......................................................... 429/435
See application file for complete search history.

(56) References Cited

U.S. PATENT DOCUMENTS

| 2009/0110993 A1* | 4/2009 | Backhaus-Ricoult ...... H01M 8/04223 429/433 |
| 2009/0325013 A1* | 12/2009 | Watanabe ......... H01M 8/04365 429/411 |
| 2010/0033132 A1* | 2/2010 | Nishi ............. B60K 6/445 320/136 |

(Continued)

FOREIGN PATENT DOCUMENTS

| JP | 2016-35910 A | 3/2016 |
| KR | 10-2015-0050289 A | 5/2015 |
| KR | 10-2018-0070273 A | 6/2018 |

*Primary Examiner* — James M Erwin
(74) *Attorney, Agent, or Firm* — Morgan, Lewis & Bockius LLP

(57) ABSTRACT

The present disclosure relates to a method of recovering performance of a fuel cell stack in a fuel cell system of a vehicle. The method includes determining whether the fuel cell stack is in a state in which a stack performance recovery operation is possible based on information collected from the vehicle using a predetermined stack state determination criterion, determining whether the vehicle is in a state in which the stack performance recovery operation is possible based on operation information of a fuel cell system, and performing the stack performance recovery operation upon determining that the fuel cell stack is in the state in which the stack performance recovery operation is possible and that the vehicle is in the state in which the stack performance recovery operation is possible.

16 Claims, 7 Drawing Sheets

(56) References Cited

U.S. PATENT DOCUMENTS

| | | | |
|---|---|---|---|
| 2010/0203408 A1* | 8/2010 | Ono | H01M 8/04303 |
| | | | 429/432 |
| 2011/0089905 A1* | 4/2011 | Yano | H02J 7/0068 |
| | | | 320/132 |
| 2018/0097245 A1* | 4/2018 | Matsusue | H01M 8/10 |
| 2018/0109121 A1* | 4/2018 | Uchida | G06N 5/04 |
| 2018/0215283 A1* | 8/2018 | Matsusue | B60L 58/40 |

* cited by examiner

METHOD OF RECOVERING PERFORMANCE OF FUEL CELL STACK

CROSS-REFERENCE TO RELATED APPLICATION

The present application claims the benefit of priority to Korean Patent Application No. 10-2019-0117133, filed on Sep. 24, 2019 in the Korean Intellectual Property Office, the entire disclosure of which is incorporated herein by reference.

TECHNICAL FIELD

The present disclosure relates to a method of recovering performance of a fuel cell stack, and more particularly to a method of controlling operation of a fuel cell system capable of recovering performance of a fuel cell stack in order to improve durability of the stack.

BACKGROUND

A fuel cell is a power generation device that induces electrochemical reaction between fuel gas and oxidizing gas to convert chemical energy in fuel into electrical energy. Such a fuel cell is widely used as a power source in industries, homes, and vehicles. The fuel cell may also be used to supply power to small-sized electric/electronic products or portable devices.

To date, a polymer electrolyte membrane fuel cell (or a proton exchange membrane fuel cell) (PEMFC), which exhibits high power density, has been most researched as the fuel cell for vehicles. In the polymer electrolyte membrane fuel cell, hydrogen is used as fuel gas, and oxygen or air including oxygen is used as oxidizing gas.

The fuel cell includes a plurality of cells in which the fuel gas and the oxidizing gas react with each other to generate electrical energy. In general, the plurality of cells is stacked and connected to each other in series in the form of a stack to satisfy power requirements.

The fuel cell for vehicles requires high power. For this reason, several hundred cells, each of which generates electrical energy, are stacked in the form of a stack in order to satisfy power requirements. A cell assembly formed by interconnecting a plurality of cells so as to be stacked is called a fuel cell stack.

Each unit cell of the polymer electrolyte membrane fuel cell includes a membrane electrode assembly (MEA), which includes a polymer electrolyte membrane capable of moving protons and catalyst electrode layers integrally attached to opposite surfaces of the polymer electrolyte membrane, a gas diffusion layer (GDL) for supplying reaction gases, such as fuel gas and oxidizing gas, to the membrane electrode assembly and transmitting generated electrical energy, a gasket for maintaining airtightness of the reaction gases and coolant, a fastening member for maintaining appropriate fastening pressure, and a bipolar plate (BP) for moving the reaction gases and the coolant.

The membrane electrode assembly includes a polymer electrolyte membrane capable of moving protons and electrode layers, such as an anode and a cathode, attached to opposite surfaces of the polymer electrolyte membrane, a catalyst for inducing reaction between hydrogen, which is fuel gas, and air (or oxygen), which is oxidizing gas, being applied to the anode and the cathode.

In each unit cell of the fuel cell, a gas diffusion layer for uniformly distributing the fuel gas and the oxidizing gas is stacked on the outside of the membrane electrode assembly, i.e., the outside of each of the anode and the cathode, and a bipolar plate for providing a channel, along which reaction gases and coolant flow, and supplying the reaction gases to the gas diffusion layer is disposed at the outside of the gas diffusion layer.

In addition, a gasket for fluid sealing is disposed between parts constituting unit cells. The gasket may be integrally formed with the membrane electrode assembly or the bipolar plate.

The above elements constitute a unit cell. A plurality of cells is stacked, end plates for supporting the cells are coupled to the outermost ends of the stacked cells, and the end plates are fastened to the cells using a fastening device in the state in which the cells are arranged between the end plates so as to be stacked in order to constitute a fuel cell stack.

A fuel cell system mounted in a fuel cell vehicle includes devices that supply reaction gases to the fuel cell stack in addition to the fuel cell stack.

That is, the fuel cell system includes a fuel cell stack configured to generate electrical energy through electrochemical reaction of reaction gases, a hydrogen supply device configured to supply hydrogen, which is used as fuel gas, to the fuel cell stack, an air supply device configured to supply air including oxygen, which is used as oxidizing gas, to the fuel cell stack, a heat and water management system configured to control operation temperature of the fuel cell stack and to perform a heat and water management function, and a fuel cell system controller configured to control overall operation of the fuel cell system.

In the conventional fuel cell system, the hydrogen supply device may include a hydrogen storage unit (a hydrogen tank), a regulator, a hydrogen pressure control valve, and a hydrogen recirculator, the air supply device may include an air blower or an air compressor and a humidifier, and the heat and water management system may include a water trap, an electric water pump (a coolant pump), a water tank, and a radiator.

High-pressure hydrogen from the hydrogen storage unit of the hydrogen supply device is decompressed to predetermined pressure by the regulator and is then supplied to the fuel cell stack. At this time, the decompressed hydrogen is supplied to the fuel cell stack in a state in which pressure and supplied quantity thereof are controlled according to an operation condition of the fuel cell stack.

In addition, residual hydrogen that has not been reacted in the fuel cell stack is discharged through an outlet of an anode (a hydrogen electrode) of the stack or is recirculated to an inlet of the anode of the stack.

The hydrogen recirculator is a device capable of improving reliability in supplying hydrogen and lifespan of the fuel cell. There are various recirculation methods, and a method using an ejector, a method using a blower, and a method using both an ejector and a blower are known.

The hydrogen recirculator recirculates unreacted hydrogen that has not been used in the anode of the fuel cell stack to the anode (the hydrogen electrode) of the stack through a recirculation pipe in order to reuse hydrogen.

Also, in the fuel cell, the greater the amount of foreign matter that moves to the anode through an electrolytic membrane in the stack, such as nitrogen, water, and vapor, the less the amount of hydrogen in the anode, whereby reaction efficiency is reduced. Consequently, a hydrogen purge valve installed in a stack anode exhaust line may be opened to purge hydrogen.

Meanwhile, durable lifespan of the fuel cell stack is a very important factor in securing marketability of a fuel cell vehicle. Consequently, various efforts have been competitively made in order to prevent degradation of the fuel cell stack and to increase durable lifespan of the fuel cell stack, and causes of stack degradation have been variously investigated.

Furthermore, in recent years, commercial vehicles, such as buses or trucks, as well as cars have increasingly required a fuel cell system. As a result, control technology capable of improving durability of the fuel cell system has increasingly been a focus of interest. In particular, research capable of minimizing degradation of the fuel cell stack in the fuel cell system has been actively conducted.

In connection with durability of the fuel cell stack, stack degradation may be mainly classified into reversible degradation and irreversible degradation. Degradation occurs due to various causes, and a representative cause of the reversible degradation is generation of a platinum catalyst oxide (Pt—OH).

The platinum catalyst oxide serves as a factor of reversible degradation in the early stage of generation thereof. In the case in which the oxide continuously remains in the stack, however, the oxide is converted into a factor of irreversible degradation through unintended chemical reaction, which leads to unrecoverable degradation in durability of the stack.

Consequently, it is necessary to remove the oxide in order to recover performance of the fuel cell stack. In order to secure durability of stack, recovery operation of periodically removing oxide causing reversible degradation at an appropriate time is required (minimization in reduction of durability leads to improvement in efficiency of the stack).

As a method of removing the oxide to recover performance of the fuel cell stack, a method of inducing a reduction reaction through stack potential fluctuation, i.e., voltage sweeping, is well known.

In addition, it is advantageous to keep exposure voltage low for a long time in order to effectively perform voltage sweeping type stack performance recovery operation, and it is known that the improvement effect is remarkable in the case in which voltage fluctuation is repeatedly caused.

When the stack performance recovery operation scheme is applied to a vehicle, however, the following problems are encountered.

First, whether the vehicle is in a state in which operation for recovering performance of the fuel cell stack is possible using the voltage sweeping scheme must be determined. Basically, the fuel cell stack must output current at any time according to a driver request based on characteristics thereof in the vehicle. In order to perform voltage sweeping several times while satisfying the above request, therefore, an accurate determination criterion for securing stack performance recovery operation time is necessary, and this determination must be made in consideration of both the state of the vehicle and the state of the fuel cell stack.

In addition, in the state in which a load is not generally present as a means for controlling voltage sweeping, it is difficult to cause voltage fluctuation, and even in the case in case in which voltage is formed, it takes a long time to discharge electricity (to lower voltage). Consequently, a means for rapidly and effectively causing voltage fluctuation is required.

Also, in order to maximize the effect of improving durability through recovery operation, it is necessary to maintain the fuel cell stack at low voltage for a long time. Furthermore, it is necessary to continuously perform recovery operation several times in a low voltage state. In the case in which the recovery operation has not been completed depending on a driver output request or the situation of the vehicle, however, it is necessary to perform determination thereof and to reflect the same in the next recovery operation in order to maximize the effect of recovery operation.

The information disclosed in the Background section above is to aid in the understanding of the background of the present disclosure, and should not be taken as acknowledgement that this information forms any part of prior art.

SUMMARY

The present disclosure has been made in an effort to solve the above-described problems associated with the prior art, and an object of the present disclosure is to provide a method of recovering performance of a fuel cell stack by accurately determining whether a stack is in a state in which operation for recovering performance of the stack is possible and whether a vehicle is in a state in which operation for recovering performance of the stack is possible, thereby appropriately securing a performance recovery operation time during traveling of the vehicle, and more effectively performing voltage sweeping and stack performance recovery.

In one aspect of the present disclosure, a method of recovering performance of a fuel cell stack in a fuel cell system of a vehicle may include determining, by a controller, whether the fuel cell stack is in a state in which a stack performance recovery operation is possible based on information collected from the vehicle using a predetermined stack state determination criterion, determining, by the controller, whether the vehicle is in a state in which the stack performance recovery operation is possible based on operation information of a fuel cell system, and performing, by the controller, the stack performance recovery operation upon determining that the fuel cell stack is in the state in which the stack performance recovery operation is possible and that the vehicle is in the state in which the stack performance recovery operation is possible.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
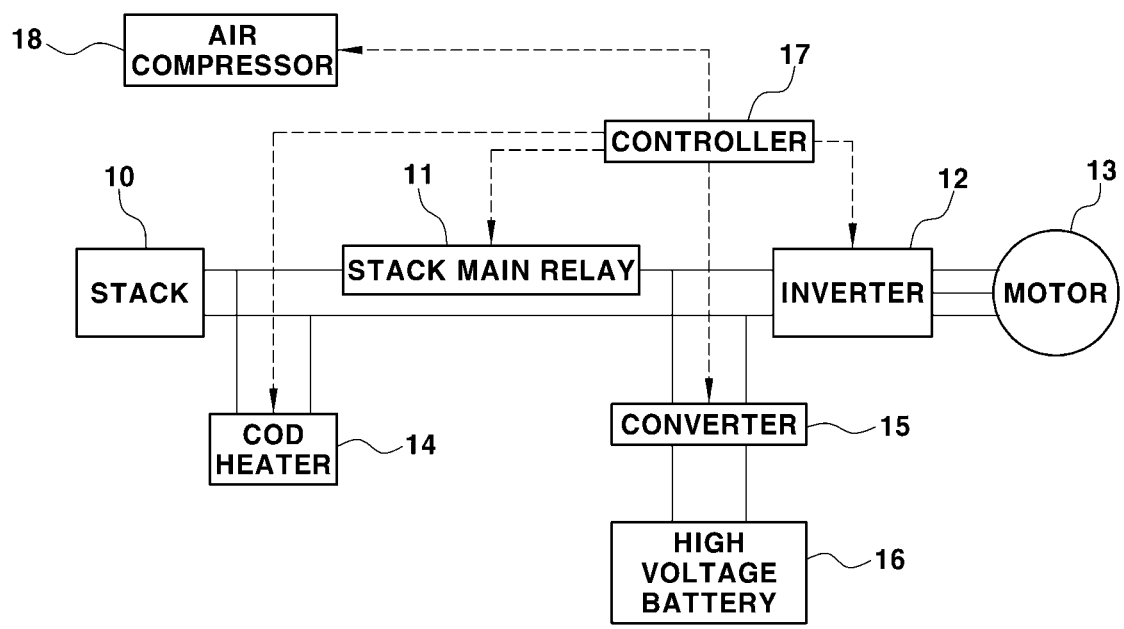
FIG. 1 is a view schematically showing main components of a power net construction of a fuel cell system that performs operation for recovering performance of a fuel cell stack according to one aspect of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, the exemplary embodiment of the present disclosure will be described in detail with reference to the accompanying drawings to allow those skilled in the art to easily practice the present disclosure. However, the present disclosure is not limited to the embodiments disclosed herein and may be implemented in various different forms.

The terms "comprises" and "includes" described herein should be interpreted not to exclude other elements but to further include such other elements unless mentioned otherwise.

First, the present disclosure relates to a method of recovering performance of a fuel cell stack, which is a component of a fuel cell system mounted in a fuel cell vehicle, capable of preventing irreversible degradation of the fuel cell stack and thus improving durability of the stack.

According to one aspect of the present disclosure, logic for determining whether a vehicle is in a state in which operation of recovering performance of the fuel cell stack is possible using information, such as an integrated value of stack current, an accumulated traveling distance, the number of fuel cell stop entries, state of charge (SOC) of a battery, dischargeable power of the battery, and stack request output is disclosed.

According to one aspect of the present disclosure, a method of effectively causing voltage fluctuation using an air compressor and a cathode oxygen depletion (COD) heater is disclosed. For electrical isolation between a high voltage battery and the COD heater during voltage fluctuation, control to a main relay is also performed.

According to one aspect of the present disclosure, a time at which the recovery operation has not been completed depending on a driver output request or the situation of the vehicle is determined, and determination thereof is reflected in the next stack performance recovery operation in order to maximize the effect of the stack performance recovery operation.

FIG. 1 is a view schematically showing main components of a power net construction of a fuel cell system that performs operation for recovering performance of a fuel cell stack according to one aspect of the present disclosure.

Referring to FIG. 1, a fuel cell system mounted in a fuel cell vehicle includes a fuel cell stack 10, which serves as a main power source (electric power source) of the vehicle, a high voltage battery (main battery) 16, which serves as an auxiliary power source of the vehicle, a bidirectional high voltage DC/DC converter (BHDC) 15 connected to the high voltage battery 16 to control output of the high voltage battery 16, an inverter 12 connected to the fuel cell stack 10 and a main bus terminal, which is the output side of the high voltage battery 16, a driving motor 13 connected to the inverter 12, and a controller 17 configured to control operation of the fuel cell system.

The controller 17 of the fuel cell system according to an exemplary embodiment of the present disclosure may be a processor (e.g., computer, microprocessor, CPU, ASIC, circuitry, logic circuits, etc.). The controller 17 may be implemented by a non-transitory memory storing, e.g., a program(s), software instructions reproducing algorithms, etc., which, when executed, controls operations of various components of the fuel cell vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

In FIG. 1, reference numeral 14 indicates a COD heater 14 connected to the main bus terminal so as to be operated by output (output current) of the fuel cell stack 10 in order to heat stack coolant, reference numeral 18 indicates an air compressor configured to supply air, which is used as oxidizing gas, to the fuel cell stack 10. These are also components of the fuel cell system.

According to one aspect of the present disclosure, the COD heater 14 and the air compressor 18 may be used as a means configured to sweep stack voltage (to fluctuate voltage) during operation for recovering performance of the fuel cell stack 10.

As shown in FIG. 1, in the fuel cell system, the fuel cell stack 10, which is a main power source, and the high voltage battery 16, which is an auxiliary power source, are connected to the inverter 12/the driving motor 13, which are loads in the system, in parallel via the main bus terminal.

In addition, a converter 15, i.e., a bidirectional high voltage DC/DC converter (BHDC), connected to the high voltage battery 16, is connected to the main bus terminal, which is the output side of the fuel cell stack 10, such that controlling outputs of the fuel cell stack 10 and the high voltage battery 16 is possible by controlling a voltage of the bidirectional high voltage DC/DC converter 15 (output voltage to the main bus terminal).

In addition, a main relay 11 configured to selectively connect the fuel cell stack to the main bus terminal is installed at the output side of the fuel cell stack 10.

In addition, the driving motor 13 is a motor configured to drive the vehicle. The inverter 12 is connected to the output sides of the fuel cell stack 10 and the high voltage battery 16 via the main bus terminal, and phase-converts power supplied from the fuel cell stack and the high voltage battery 16 to drive the driving motor 13.

According to one aspect of the present disclosure, the controller 17 controls overall operation of components of the fuel cell system. For example, the controller 17 controls operation of the main relay 11, the inverter 12, the COD heater 14, the converter 15, and the air compressor 18.

According to one aspect of the present disclosure, a method of controlling operation of an electric load device connected to the fuel cell stack so as to receive power therefrom and thus to consume power of the stack, i.e., an electric load device configured to act as an electric load with respect to the fuel cell stack, in order to sweep stack voltage is used as a method of recovering performance of stack. At this time, operation of the electric load device is controlled by the controller 17.

That is, when the controller 17 outputs a control signal for sweeping stack voltage during operation for recovering performance of the stack, operation of the electric load device is controlled such that the stack voltage is swept according to the control signal output by the controller 17.

As described above, in the present disclosure, the COD heater 14 and the air compressor 18 may be used as the electric load device for sweeping the stack voltage, and the controller 17 controls operation of the COD heater 14 and the air compressor 18 such that the stack voltage is swept during operation for recovering performance of the stack.

The operation for recovering performance of the stack will be described below in detail.

Figure 2:
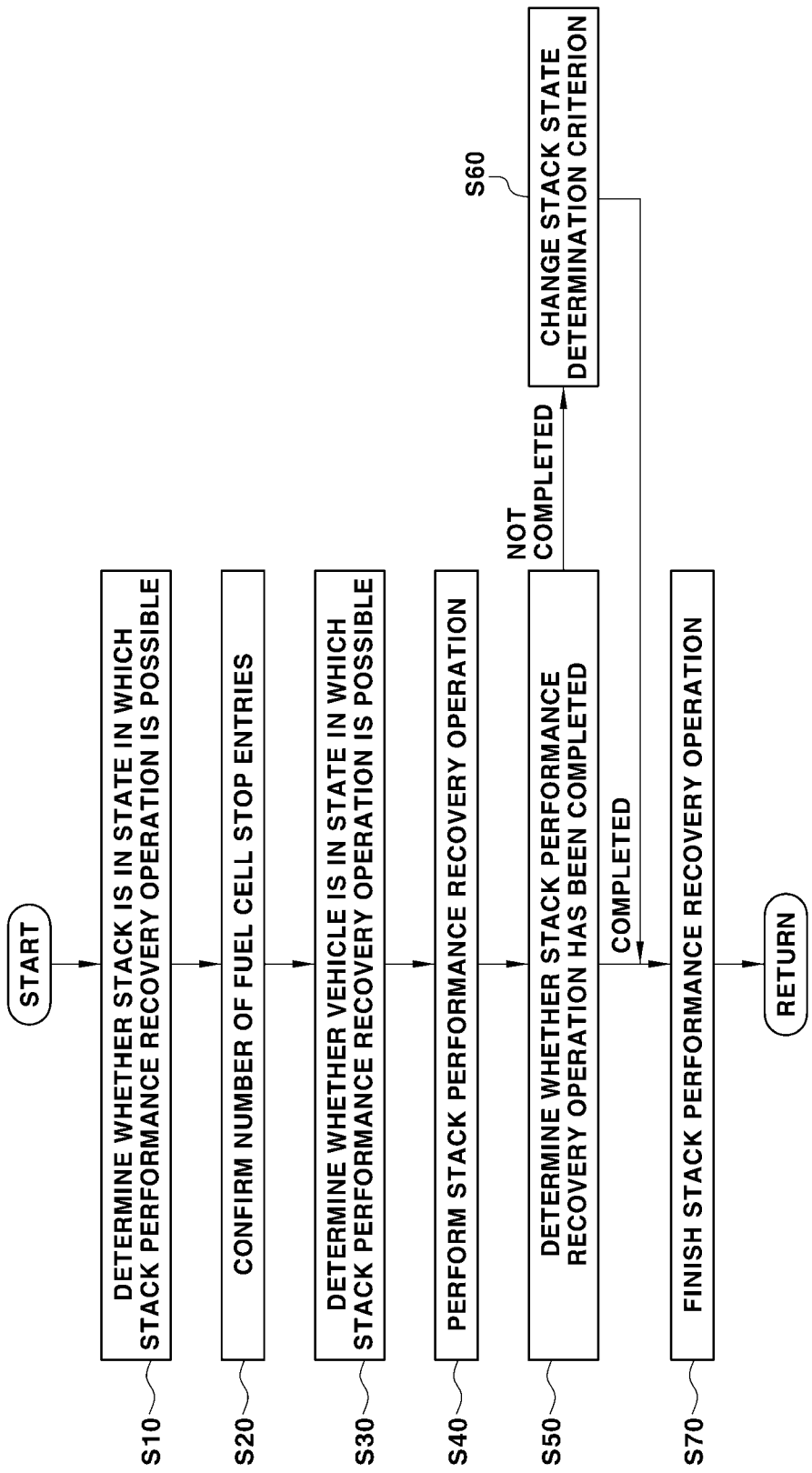
FIG. 2 is a flowchart showing all processes for recovering performance of the fuel cell stack according to one aspect of the present disclosure.

FIG. 2 is a flowchart showing all processes for recovering performance of the fuel cell stack according to one aspect of the present disclosure, wherein a process of controlling operation of the fuel cell system for stack performance recovery according to one aspect of the present disclosure is shown.

The operation for recovering performance of the fuel cell stack according to one aspect of the present disclosure is performed by the controller 17 based on information collected from the vehicle, and the controller 17 may be a fuel cell system controller configured to control overall operation of the fuel cell system.

According to one aspect of the present disclosure, the controller 17 is set to perform all processes for recovering performance of the fuel cell stack shown in FIG. 2 and to execute detailed logics for each process shown in FIGS. 3 to 6.

As shown in FIG. 2, a method of recovering performance of the fuel cell stack according to one aspect of the present disclosure includes a process of the controller 17 determining whether the stack is in a state in which operation for recovering performance of the stack is possible (S10), a process of the controller 17 determining whether the vehicle is in a state in which operation for recovering performance of the stack is possible (S30), and a process of the controller 17 performing operation for recovering performance of the stack in the case in which each of the stack and the vehicle is in a state in which operation for recovering performance of the stack is possible (S40).

In addition, the method of recovering performance of the fuel cell stack according to one aspect of the present disclosure may further include a process of the controller 17 confirming the number of fuel cell stop entries (S20) after the process of determining whether the stack is in a state in which operation for recovering performance of the stack is possible and before the process of determining whether the vehicle is in a state in which operation for recovering performance of the stack is possible.

In this case, the controller 17 performs the subsequent process of performing operation for recovering performance of the stack only in the case in which each of the stack and the vehicle being in a state in which operation for recovering performance of the stack is possible is satisfied and a condition related to the number of fuel cell stop entries is satisfied.

In addition, the method of recovering performance of the fuel cell stack according to one aspect of the present disclosure may further include a process of the controller 17 determining whether operation for recovering performance of the stack has been completed (S50) and a process of the controller 17 changing a stack state determination criterion in the case in which operation for recovering performance of the stack has not been completed (S60).

According to one aspect of the present disclosure, in the case in which the controller 17 determines that operation for recovering performance of the stack has been completed or changes the stack state determination criterion, the controller 17 finishes operation for recovering performance of the stack (S60).

In the following description, the stack means the fuel cell stack 10 of the fuel cell system mounted in the fuel cell vehicle, the fuel cell in the fuel cell stop means the fuel cell stack, and recovery of performance of the stack means recovery of performance of the fuel cell stack.

In addition, operation for recovering performance of the stack may mean operation of the fuel cell system to recover performance of the fuel cell stack, and control of operation of the fuel cell system to recover performance of the stack is performed by the controller 17.

In addition, according to one aspect of the present disclosure, voltage sweeping means sweeping of voltage of the fuel cell stack 10, and voltage sweeping and voltage fluctuation may be understood to have the same meaning.

Figure 3:
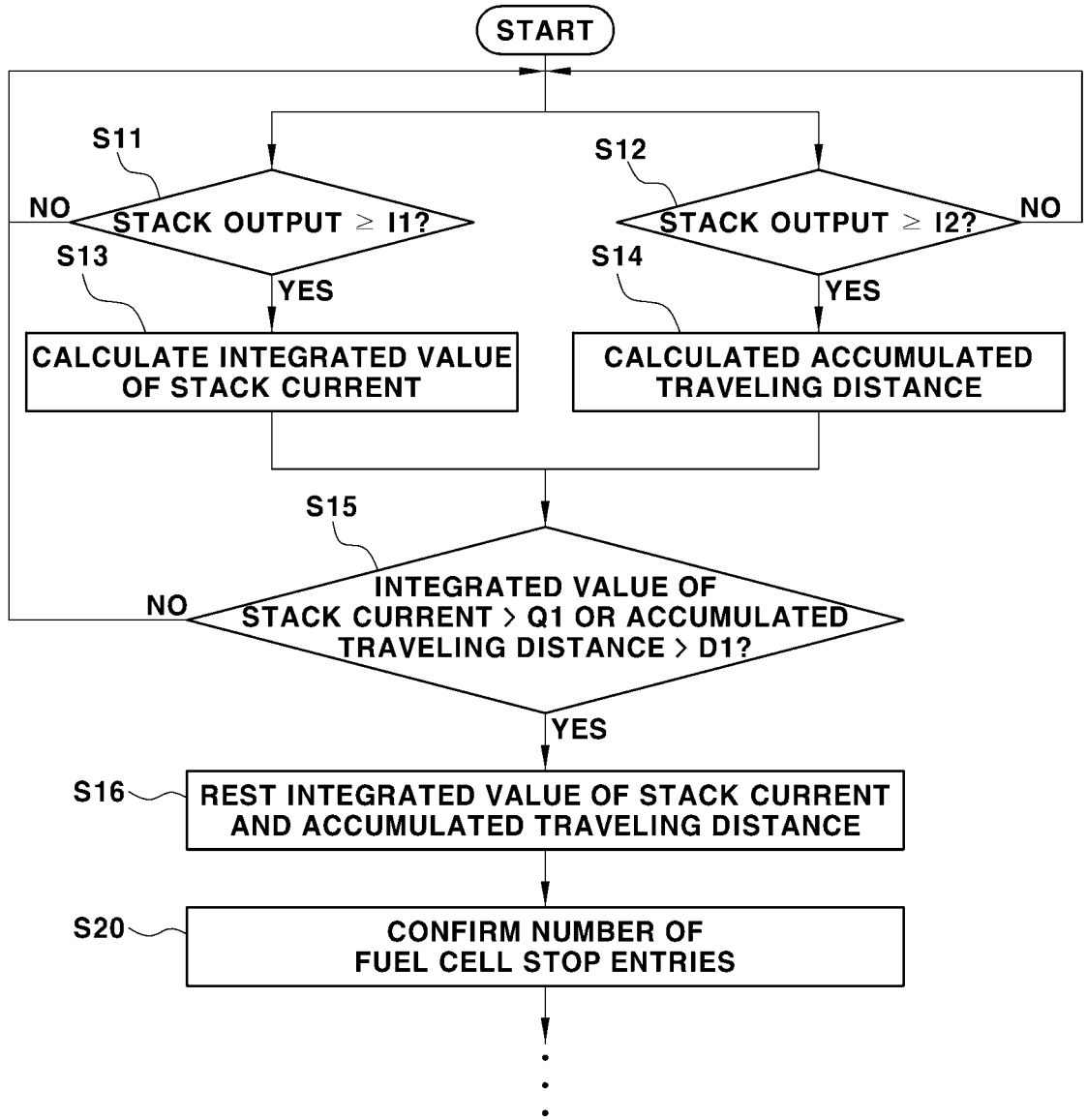
FIG. 3 is a flowchart showing a method of determining whether the stack is in a state in which operation for recovering performance of the stack is necessary in one aspect of the present disclosure.

FIG. 3 is a flowchart showing a method of determining whether the stack is in a state in which operation for recovering performance of the stack is possible, according to one aspect of the present disclosure. The stack being in a state in which operation for recovering performance of the stack is possible may mean that the stack is in a state in which operation for recovering performance of the stack is necessary, and in order to enter operation for recovering performance of the stack, whether the stack is in a state in which operation for recovering performance of the stack is necessary must be determined first.

According to one aspect of the present disclosure, a scheme of operation for recovering performance of the stack is a scheme of recovering reversible degradation of the fuel cell stack 10 due to catalyst oxide, and the greater the number of times that the fuel cell stack 10 is used, the more catalyst oxide is generated. In the stack state determination criterion, therefore, how many times the stack has been used is important.

According to one aspect of the present disclosure, therefore, the state of the stack for entering operation for recovering performance of the stack is determined based on an integrated value of stack current or the accumulated traveling distance of the vehicle that has traveled at a stack output of a predetermined level or more.

At this time, the controller 17 determines and uses an integrated value of stack current having a lower limit value I1 or more during operation of the fuel cell system. In FIG. 3, I1 indicates the lower limit value, which is a value preset by the controller 17 in order to remove a noise value of the stack current, may be set to a small value capable of distinguishing between noise values.

According to one aspect of the present disclosure, as described above, in determining the integrated value of stack current, the lower limit value I1 of the integrated stack current is applied in order to remove the noise value, and the integrated value of stack current is determined when stack output, i.e., the stack current, has the lower limit value I1 or more (S11 and S13).

The controller 17 is set to integrate only stack current (stack output) having the lower limit value I1 or more when determining the integrated value of stack current.

In addition, in determining the accumulated traveling distance, the controller 17 cumulatively determines the traveling distance of the vehicle when the stack output has a predetermined first output reference value I2 or more during traveling of the vehicle and operation of the fuel cell system (S12 and S14). Here, the stack output may be stack current.

That is, the accumulated traveling distance of the vehicle that has traveled at a stack current of the first output reference value I2 or more is determined. In FIG. 3, 12 indicates the first output reference value, which is a value for cumulatively determining the traveling distance of the vehicle when the stack 10 is used and which may be set to a value capable of representing the stack output.

According to one aspect of the present disclosure, as described above, the traveling distance of the vehicle when the stack current is the first output reference value I2 or more is accumulated in order to determine the accumulated traveling distance. As described above, in FIG. 3, both the lower limit value I1 and the first output reference value I2 may be values set for the stack current.

According to one aspect of the present disclosure, at least one of the integrated value of stack current or the accumulated traveling distance may be used. In the case in which the integrated value of stack current is greater than a predetermined current integration reference value Q1 or in the case in which the accumulated traveling distance is greater than a predetermined distance reference value D1, the controller 17 determines that the stack is in a state in which operation for recovering performance of the stack is necessary (S15).

Upon determining that the stack is in a state in which operation for recovering performance of the stack is necessary, the controller 17 resets the integrated value of stack current or the accumulated traveling distance (S16), and performs a subsequent process for stack performance recovery, i.e., the process of confirming the number of fuel cell stop entries (S20).

In FIG. 3, Q1 indicates the current integration reference value, and D1 indicates the distance reference value. Both Q1 and D1 are stack state determination criteria for determining how many times the stack has been used, and the entry cycle and execution cycle of the stack performance recovery operation are decided based on these values.

Several technologies capable of monitoring the state of the stack 10 have been proposed, and most of the technologies use a scheme of estimating a gradient in a stack current-voltage characteristic curve. In order to estimate a reliable value using this scheme, however, the stack must be operated in various current zones.

In the case in which the vehicle is mainly driven in a local current zone depending on a driving scheme of a driver, therefore, it is not possible to determine whether stack performance recovery operation is necessary.

In an actual commercial vehicle, an abrupt change in stack output may reduce durability of the vehicle, and the vehicle may suffer from thermal shock due to a large amount of heat that is generated in the vehicle. For this reason, a stack fixed point driving strategy is assumed in many cases. Consequently, the scheme of estimating the gradient in the stack current-voltage characteristic curve is not suitable for determining the stack state.

Figure 4:
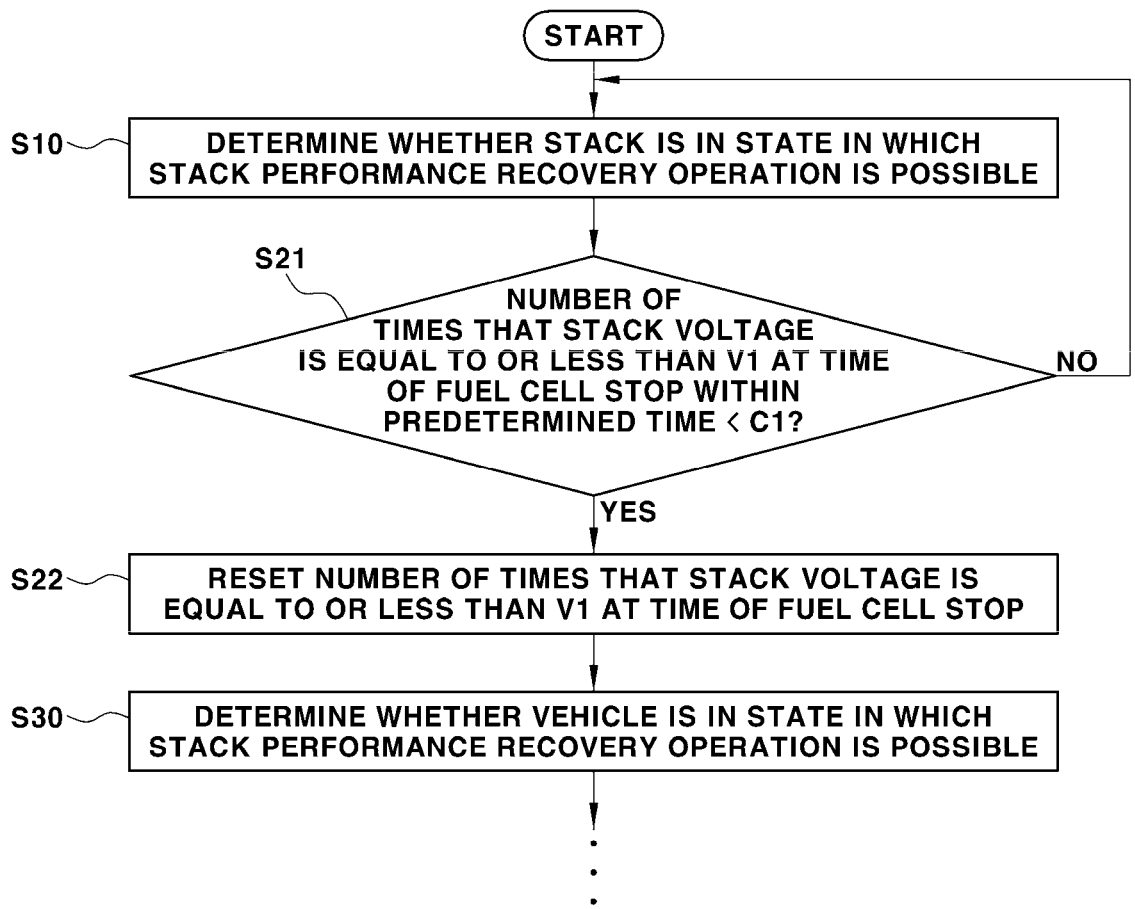
FIG. 4 is a flowchart showing a method of confirming the number of fuel cell stop entries in one aspect of the present disclosure.

FIG. 4 is a flowchart showing a method of confirming the number of fuel cell stop entries according to one aspect of the present disclosure. According to one aspect of the present disclosure, as described above, a scheme for performance recovery operation through stack voltage sweeping is assumed.

During traveling of the fuel cell vehicle, however, a fuel cell stop state may occur, and the stack voltage may be lowered to low potential due to natural discharge in the fuel cell stop state. In the case in which the stack voltage is lowered due to the fuel cell stop and thus a change in voltage is a predetermined level or more, as described above, the effect of stack performance recovery is achieved.

According to one aspect of the present disclosure, therefore, in the case in which the fuel cell stop state repeatedly occurs within a predetermined time during operation of the fuel cell system and thus the number of times that the stack voltage is lowered to a predetermined voltage reference value V1 or less is equal to or greater than a predetermined first number of times C1, the controller 17 may be set to determine that the stack performance recovery operation is unnecessary.

If not so, i.e., in the case in which the number of times that the stack voltage is lowered to a predetermined voltage reference value V1 or less at the time of the fuel cell stop within the predetermined time is less than the predetermined first number of times C1 at step S21 of FIG. 4, the controller 17 resets the number of times that the stack voltage is equal to or less than the voltage reference value V1 after the predetermined time (S22), and performs a subsequent process for stack performance recovery, i.e., a process of determining whether the vehicle is in a state in which entry into operation for recovering performance of the stack is possible (S30).

In FIG. 4, V1 indicates the voltage reference value, which is given to prescribe a voltage level capable of achieving the effect of the stack performance recovery operation due to fuel cell stop and may be set to low voltage capable of achieving the effect of stack performance recovery operation.

According to one aspect of the present disclosure, when the stack voltage is lowered to the voltage reference value V1 at the time of fuel cell stop, it is possible to achieve the effect of the stack performance recovery operation. Particularly, when the number of times that the stack voltage is lowered to the voltage reference value V1 or less is less than the predetermined first number of times C1 at the time of fuel cell stop, a subsequent process for stack performance recovery is continuously performed.

In FIG. 4, C1 indicates the minimum number of times necessary to achieve the effect of stack performance recovery operation, i.e., the predetermined first number of times C1. In the case in which the number of times that the stack voltage is lowered to the voltage reference value V1 or less is less than the predetermined first number of times C1 during the predetermined time, the controller 17 determines that it is not possible to achieve the effect of the stack performance recovery operation, and performs a subsequent process for stack performance recovery.

In general, entry into the fuel cell stop is performed in the state in which there is no stack output. Consequently, in the case in which the integrated value of stack current is greater than the current integration reference value Q1 in the previous stack state confirmation process or in the case in which the accumulated traveling distance is greater than the distance reference value D1, the state of fuel cell stop may be somewhat avoided according to the stack output conditions at this time.

In addition, since it takes a long time for the stack voltage to be lowered to the voltage reference value V1 or less due to only natural lowering of voltage at the time of fuel cell stop, the possibility of the case in which stack voltage is lowered to the voltage reference value V1 or less at the time of fuel cell stop occurring several times within the predetermined time is not high.

Consequently, the process of confirming the number of fuel cell stop entries is not a requisite process that must be necessarily performed during operation of recovering performance of the fuel cell stack.

That is, in the case in which the controller 17 determines that the stack 10 is in a state in which entry into stack performance recovery operation is necessary, logics may be configured to determine whether the vehicle is in a state in which entry into the stack performance recovery operation is possible after the process of confirming the number of fuel cell stop entries. Unlike this, the controller 17 may confirm the stack state and then immediately confirm the vehicle state without the process of confirming the number of fuel cell stop entries.

Figure 5:
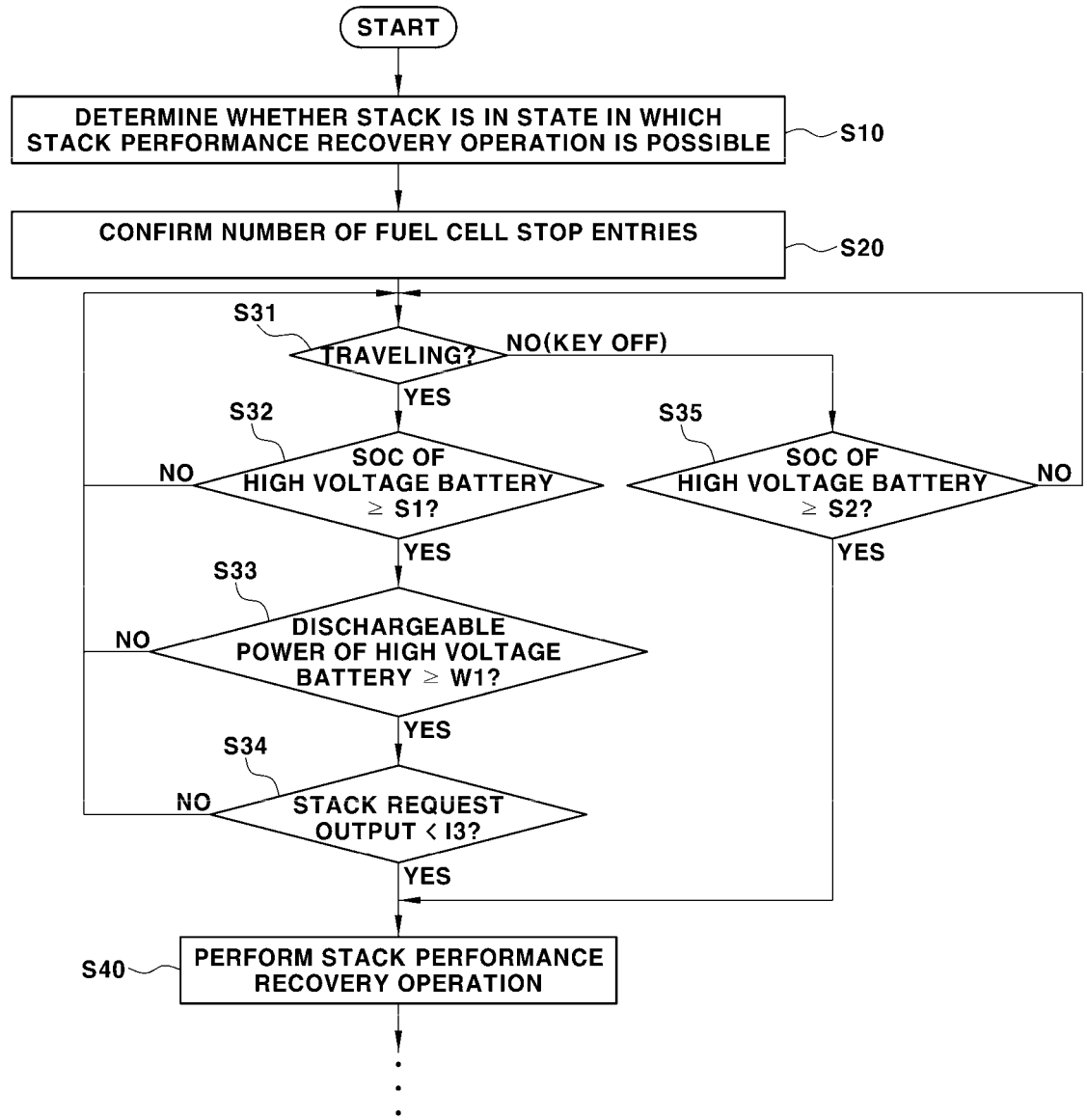
FIG. 5 is a flowchart showing a method of determining whether a vehicle is in a state in which operation for recovering performance of the stack is possible in one aspect of the present disclosure.

FIG. 5 is a flowchart showing a method of determining whether the vehicle is in a state in which operation for recovering performance of the stack is possible, according to one aspect of the present disclosure. According to one aspect of the present disclosure, the controller 17 is set to confirm whether the vehicle is in a state in which operation for recovering performance of the stack is possible according to logics illustrated in FIG. 5.

That is, upon determining that the stack is in a state in which entry into performance recovery operation is necessary in process S10 and upon confirming the number of fuel cell stop entries and upon determining that the stack is in a state in which performance recovery operation is necessary in process S20, the controller 17 determines whether the vehicle is in a state in which performance recovery operation is possible in a subsequent process S30 (see FIG. 2).

Since the vehicle basically must generate output desired by the driver, it is confirmed whether traveling of the vehicle is possible without output of the stack 10, and in the case in which traveling of the vehicle is possible without output of the stack, performance recovery operation must be performed in a subsequent process.

In this process, the controller 17 confirms whether traveling of the vehicle is possible without output of the stack 10. In the case in which traveling of the vehicle is possible without output of the stack 10, the controller 17 determines that the vehicle is in a state in which stack performance recovery operation is possible.

Referring to FIG. 5, detailed steps of the process of determining whether the vehicle is in a state in which stack performance recovery operation is possible are shown.

As shown in FIG. 5, the controller 17 determines whether the vehicle is traveling in a key on state (S31), and in the case in which the vehicle is traveling, compares SOC of the high voltage battery (the main battery) 16 connected to the driving motor so as to supply power thereto with a predetermined first SOC reference value S1 (S32).

Here, in the case in which the SOC of the high voltage battery 16 is equal to or greater than the first SOC reference value S1, the controller 17 compares dischargeable power of the high voltage battery 16 with a predetermined first power reference value W1 (S33).

Subsequently, in the case in which the dischargeable power of the high voltage battery 16 is equal to or greater than the first power reference value W1, the controller 17 compares the current stack request output decided at the time of operation of the fuel cell system with a predetermined second output reference value I3 (S34). Subsequently, in the case in which the stack request output is less than the second output reference value I3, the controller 17 determines that the vehicle is in a state in which stack performance recovery operation is possible even though the vehicle is traveling.

That is, when the condition in which the vehicle is traveling in a key on state, the condition in which the SOC of the high voltage battery 16 is equal to or greater than the first SOC reference value S1, the condition in which dischargeable power of the high voltage battery 16 is equal to or greater than the first power reference value W1, and the case in which the stack request output is less than the second output reference value I3 are all satisfied, the controller 17 determines that the vehicle is in a state in which stack performance recovery operation is possible even though the vehicle is traveling.

On the other hand, in the case in which the vehicle is in a key off state and is not traveling, the controller 17 compares SOC of the high voltage battery 16 with a second SOC reference value S2 (S35), and in the case in which the SOC of the high voltage battery 16 is equal to or greater than the second SOC reference value S2, determines that the vehicle is in a state in which stack performance recovery operation is possible.

As described above, the controller 17 confirms whether the vehicle is traveling, whether the vehicle is in a key on/off state, the SOC of the high voltage battery (the main battery) 16, the dischargeable power of the high voltage battery 16, and the stack request output in order to determine whether the vehicle is in a state in which stack performance recovery operation is possible.

Here, the stack request output, which is a value decided from operation information of the fuel cell system, may mean a current value requested by the stack. A method of deciding the current stack request output from the operation information of the fuel cell system is known in the art, and a detailed description thereof will be omitted.

In FIG. 5, S1 indicates the first SOC reference value. When the vehicle is traveling in a key on state, the controller 17 determines that stack performance recovery operation is possible only in the case in which the SOC of the high voltage battery 16 is equal to or greater than the first SOC reference value S1.

Whether the SOC of the high voltage battery 16 is equal to or greater than the first SOC reference value S1 is information about whether traveling of the vehicle is possible using the high voltage battery 16 without output of the stack 10. The higher the SOC of the high voltage battery 16, the longer the performance recovery operation time.

In the case in which the first SOC reference value S1 is set to too a high value to reach during traveling, however, stack performance recovery operation may not be possible, and therefore it is necessary to set the first SOC reference value S1 to an appropriate value (e.g. S1=60%).

In FIG. 5, W1 indicates the first power reference value, which is a value set by the controller 17 so as to determine that traveling of the vehicle is possible using the high voltage battery 16 and may be set to a value equal to or greater than the average request output of the driving motor 13.

According to one aspect of the present disclosure, in the case in which the dischargeable power of the high voltage battery 16 is equal to or greater than the first power reference value W1, the controller 17 determines that traveling of the vehicle is possible using the high voltage battery 16.

In FIG. 5, 13 indicates the second output reference value I3, which is compared with the stack request output and is set by the controller 17 to a low value so as to determine that output requested by the vehicle can be provided by the high voltage battery 16 and there is little stack request output (e.g. second output reference value=5A).

In FIG. 5, S2 indicates the second SOC reference value S2. In the case in which the vehicle is not traveling and is in a key off state, the controller 17 determines that stack performance recovery operation is possible when the SOC of the high voltage battery 16 is equal to or greater than the second SOC reference value S2.

In the key off state, in which the vehicle is not traveling, it is sufficient to secure low SOC of the battery necessary to perform stack performance recovery operation (air compressor on/off control, etc.), and therefore the second SOC reference value S2 may be set to a value lower than the first SOC reference value S1 (e.g. S2=25%).

Figure 6:
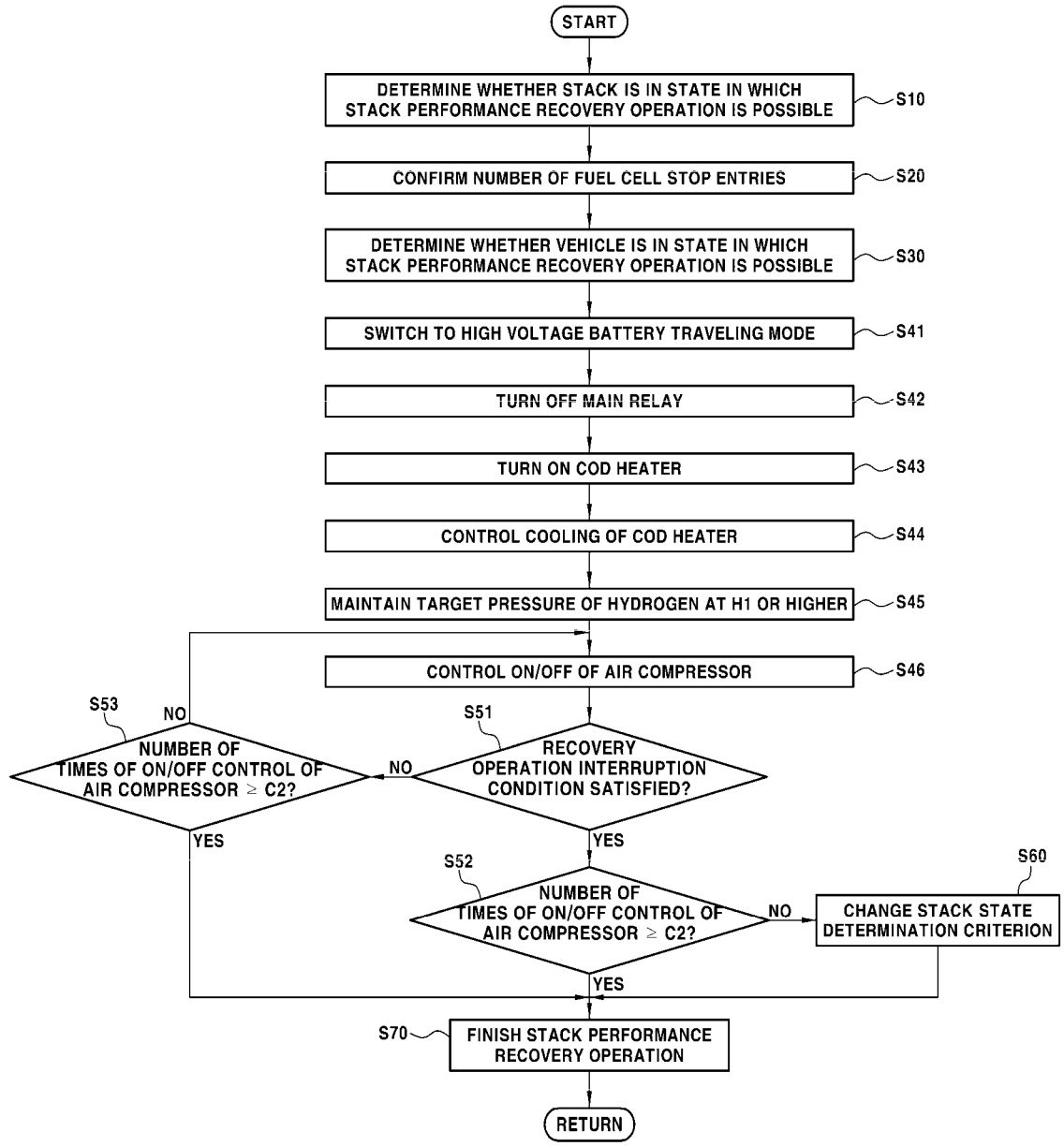
FIG. 6 is a flowchart showing a method of determining whether operation for recovering performance of the stack has been completed and changing a stack state determination criterion when not completed in one aspect of the present disclosure.

FIG. 6 is a flowchart showing a method of determining whether operation for recovering performance of the stack has been completed and changing a stack state determination criterion when not completed, according to one aspect of the present disclosure.

As shown in FIG. 1, in the case in which each of the stack and the vehicle being in a state in which stack performance recovery operation is possible is satisfied and the condition related to the number of fuel cell stop entries is satisfied, the controller 17 performs a predetermined stack performance recovery operation process.

According to one aspect of the present disclosure, stack performance recovery may be achieved by operating the COD heater 14 and at the same time repeatedly controlling on/off of the compressor 18 to sweep stack voltage.

That is, in the case in which the stack being in a state in which stack performance recovery operation is possible is satisfied, in the case in which the predetermined condition is satisfied by confirming the number of fuel cell stop entries, and in the case in which the vehicle being in a state in which stack performance recovery operation is possible is satisfied, the controller 17 performs the stack performance recovery operation shown in FIG. 6.

In the stack performance recovery operation process, first, a vehicle traveling mode is switched to a high voltage battery traveling mode (stack output for traveling being limited) (S41). The high voltage battery traveling mode is a mode in which the vehicle travels through battery discharge and a mode in which the driving motor 13 is driven using charged power of the high voltage battery 16, rather than generated power of the fuel cell stack 10, such that the vehicle travels.

Subsequently, the controller 17 turns off the main relay 11 of the fuel cell system (S42), turns on the COD heater 14 (S43), controls cooling of the COD heater (S44), and controls hydrogen supply pressure to be a predetermined target pressure H1 or higher (S45).

At this time, when the main relay is turned off by the controller 17, an electrical path formed from the high voltage battery 16 when the COD heater is turned on may be interrupted.

When the COD heater 14 is turned on while stack performance recovery operation is performed in the state in which the main relay 11 is off, as described above, the COD heater 14 may be used as an electric load that consumes stack power.

In addition, the process of controlling cooling of the COD heater 14 may be a process of controlling temperature of the COD heater in order to prevent overheating of the COD heater. While cooling of the COD heater 14 is controlled, the controller 17 operates a coolant pump (not shown) at a predetermined rate of rotation (RPM) or more, and controls operation of a coolant bypass valve to maintain the opening degree thereof toward the COD heater at a predetermined level.

At this time, the rate of rotation of the coolant pump and opening degree of the coolant bypass valve toward the COD heater are set so as to prevent overheating of the COD heater when stack performance recovery operation is performed based on the heat generation capacity of the COD heater 14.

In addition, the controller 17 controls a hydrogen pressure control valve (not shown) to maintain the pressure of hydrogen supplied to the fuel cell stack 10, i.e., hydrogen supply pressure, at the predetermined target pressure H1 or higher. During stack performance recovery operation, it is sufficient for the hydrogen supply pressure to be maintained at a pressure necessary to generate stack voltage and to generate current due to operation of the COD heater 14, which is a load.

Consequently, the target pressure H1 during the stack performance recovery operation may be set to a value equivalent to a basic target pressure at the time of normal operation (e.g. target pressure=130 kPa).

In the state in which cooling of the COD heater 14 is controlled, as described above, the controller 17 sweeps stack voltage in order to recover performance of the stack. In order to sweep the stack voltage, the air compressor 18 is on/off controlled (S46).

That is, the controller 17 controls operation of the air compressor 18 such that the air compressor 18 is alternately turned on and off. When the air compressor is on, it is sufficient to supply only an amount of air capable of generating voltage to the stack 10, and therefore the air compressor 18 is controlled at a basic operation level at the time of normal operation.

In addition, when the controller 17 controls operation of the air compressor 18 such that the air compressor 18 is alternately turned on and off, maintenance times may be individually applied. In order to maximize the effect of the stack performance recovery operation, a time at which low potential is maintained is important, and therefore an off maintenance time may be set to be longer than an on maintenance time.

While the air compressor 18 is repeatedly controlled to be turned on and off, the controller 17 counts the number of times of on/off control of the air compressor. Basically, in the case in which the number of times of on/off control of the air compressor counted at step S52 of FIG. 6 reaches a predetermined second number of times C2, the controller 17 determines that the stack performance recovery operation has been completed.

In addition, while the air compressor 18 is repeatedly controlled to be turned on and off, the controller 17 determines whether a stack performance recovery operation interruption condition is satisfied from operation information of the fuel cell system collected from the vehicle (S51).

When the stack performance recovery operation interruption condition is satisfied, whether the stack performance recovery operation has been completed is determined (S52). Upon determining at step S52 that the stack performance recovery operation has not been completed, even though the stack performance recovery operation interruption condition is satisfied at step S51 and thus stack performance recovery operation must be interrupted, the controller 17 changes a stack state determination criterion at step S53 and then finishes stack performance recovery operation (S70).

In contrast, upon determining at step S51 that the stack performance recovery operation interruption condition is satisfied and upon determining at step S52 that the stack performance recovery operation has been completed, the controller 17 immediately finishes the stack performance recovery operation without changing the stack state determination criterion (S70).

Upon determining at step S51 that the stack performance recovery operation interruption condition is not satisfied during stack performance recovery operation, the controller 17 maintains stack performance recovery operation until the stack performance recovery operation is completed (No of step S53). At this time, the controller 17 counts the number of times of on/off control of the air compressor 18, and when the number of times of on/off control of the air compressor 18 counted at step S53 reaches the predetermined second number of times C2, determines that stack performance recovery operation has been completed and finishes the stack performance recovery operation (S70).

According to one aspect of the present disclosure, the stack performance recovery operation interruption condition may be a condition in which stack request output during stack performance recovery operation is equal to or greater than a third output reference value, a condition in which SOC of the high voltage battery 16 is less than a third SOC reference value, or a condition in which dischargeable power of the high voltage battery 16 is less than a second power reference value.

That is, according to one aspect of the present disclosure, during the stack performance recovery operation process in which the air compressor 18 is repeatedly controlled to be turned on and off to sweep stack voltage, the controller 17 compares the stack request output with the third output reference value, compares the SOC of the high voltage battery 16 with the third SOC reference value, and compares the dischargeable power of the high voltage battery 16 with the second power reference value. In the case in which the stack request output is equal to or greater than the third output reference value, the SOC of the high voltage battery 16 is less than the third SOC reference value, or the dischargeable power of the high voltage battery 16 is less than the second power reference value, the controller 17 determines that the stack performance recovery operation interruption condition is satisfied.

Upon determining that the stack performance recovery operation interruption condition is satisfied during stack performance recovery operation, as described above, the controller 17 finishes stack performance recovery operation. At this time, in the case in which the number of times of on/off control of the air compressor 18 after starting of stack performance recovery operation is less than the second number of times C2, the controller 17 determines that stack performance recovery operation has not been completed, changes a stack state determination criterion for next stack performance recovery operation (S60), and finishes stack performance recovery operation (S70).

In the case in which the number of times of on/off control of the air compressor 18 has reached the second number of times C2 when the stack performance recovery operation interruption condition is satisfied, however, the controller 17 determines that stack performance recovery operation has been completed, and immediately finishes stack performance recovery operation without changing the stack state determination criterion (S70).

In the stack performance recovery operation interruption condition, the third output reference value is a reference value for determining a situation that needs stack output due to stack performance recovery operation, and may be set by the controller 17 to a value higher than the second output reference value I3 at step S34 of the vehicle state determination process of FIG. 5.

In the stack performance recovery operation interruption condition, the third SOC reference value is a reference value for determining that the SOC of the high voltage battery 16 is excessively lowered. In the case in which stack performance recovery operation is continuously performed and thus the SOC of the high voltage battery 16 is excessively lowered, normal operation in the high voltage battery traveling mode may be impossible.

In the case in which the SOC of the high voltage battery 16 is less than the third SOC reference value, therefore, the controller 17 determines that the stack performance recovery operation interruption condition is satisfied, and finishes stack performance recovery operation in order to prevent normal operation in the high voltage battery traveling mode from being impossible.

According to one aspect of the present disclosure, the third SOC reference value S3 must be set by the controller 17 to a value lower than the first SOC reference value S1 at step S32 of the vehicle state determination process of FIG. 5, and may be set to a value identical to the second SOC reference value S2 at step S35 of the vehicle state determination process of FIG. 5 or a value less than the second SOC reference value S2 by a predetermined value or less (e.g. S2 and S3=25%).

In the stack performance recovery operation interruption condition, the second power reference value is a reference value for determining that the dischargeable power of the high voltage battery 16 is excessively lowered. In the case in which the dischargeable power of the high voltage battery 16 is excessively lowered, normal operation in the high voltage battery traveling mode may be impossible.

In the case in which the dischargeable power of the high voltage battery 16 is less than the second power reference value, therefore, the controller 17 determines that the stack performance recovery operation interruption condition is satisfied, and finishes stack performance recovery operation in order to prevent normal operation in the high voltage battery traveling mode from being impossible.

According to one aspect of the present disclosure, the dischargeable power of the high voltage battery 16 is changeable depending on temperature and voltage of the high voltage battery 16, and the controller 17 may decide the dischargeable power of the high voltage battery 16 based on information about temperature and voltage of the high voltage battery 16 collected by a detection element, such as a sensor.

A method of deciding the dischargeable power of the high voltage battery 16 is known in the art, and a detailed description thereof will be omitted.

According to one aspect of the present disclosure, the second power reference value may be set by the controller 17 to a value lower than the first power reference value W1 at step S33 of the vehicle state determination process of FIG. 5.

According to one aspect of the present disclosure, the number of times of on/off control of the air compressor may be defined in such a manner that, when the air compressor 18 is on and off for predetermined times, the number of times of on/off control of the air compressor is 1.

In addition, the second number of times C2 is the number of times set to determine whether stack performance recovery operation has been completed. In the case in which the number of times of on/off control of the air compressor has reached the second number of times C2, as described above, the controller 17 may determine that stack performance recovery operation has been completed.

Finishing of stack performance recovery operation means returning to the state before the stack performance recovery operation is performed. When stack performance recovery operation is finished, all of steps S41 to S46 performed at the time of stack performance recovery operation of FIG. 6 are finished, and switching to a normal traveling mode is performed.

Meanwhile, changing of the stack state determination criterion at step S60 is performed when the number of times of on/off control of the air compressor 18 has not reached the second number of times C2 even though the predetermined stack performance recovery operation interruption condition is satisfied and thus stack performance recovery operation must be finished, i.e., when the stack performance recovery operation has not been completed.

At this time, the stack state determination criterion is changed such that, when the stack performance recovery operation has not been completed, the next stack performance recovery operation is performed earlier than this time. Here, the stack state determination criterion may be the current integration reference value Q1, which is a criterion for determining the integrated value of stack current in the stack state determination process of FIG. 3, the distance reference value D1, which is a criterion for determining the accumulated traveling distance, or both the current integration reference value Q1 and the distance reference value D1.

Figure 7:
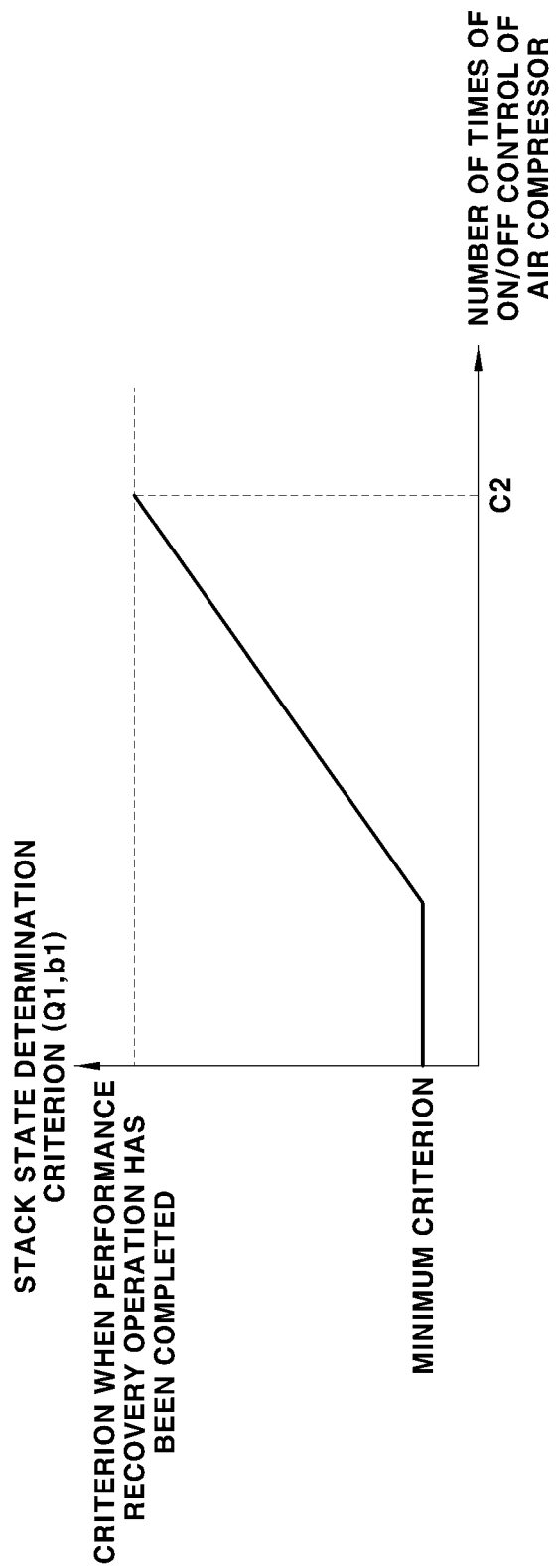
FIG. 7 is a graph showing an example in which the stack state determination criterion is changed in one aspect of the present disclosure.

FIG. 7 is a graph showing an example in which the stack state determination criterion is changed according to one aspect of the present disclosure. In the graph of FIG. 7, the minimum reference may be a lower limit value of the current integration reference value Q1 or a lower limit value of the distance reference value D1.

According to one aspect of the present disclosure, when the number of times of on/off control of the air compressor 18 has not reached the second number of times C2 even though the stack performance recovery operation interruption condition is satisfied, the reference values Q1 and D1 may be reduced by a predetermined value such that the next stack performance recovery operation is performed earlier than this time.

According to one aspect of the present disclosure, if the reference value for stack state determination is set to a very small value, excessively frequent entry into recovery operation may be performed after the stack performance recovery operation has not been completed. For this reason, an appropriate reference value of a predetermined level or more is set through a preliminary test and evaluation process.

The two reference values Q1 and D1 may be set to different values. The graph of FIG. 7 shows examples of the two reference values.

As is apparent from the above description, a method of recovering performance of a fuel cell stack according to one aspect of the present disclosure is capable of accurately determining whether a stack is in a state in which operation for recovering performance of the stack is possible and a vehicle is in a state in which operation for recovering performance of the stack is possible, thereby appropriately securing a performance recovery operation time during traveling of the vehicle, is capable of more effectively performing voltage sweeping and stack performance recovery, and is capable of inhibiting irreversible degradation of a fuel cell stack, thereby improving durability of the fuel cell stack.

The present disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of recovering performance of a fuel cell stack in a fuel cell system of a vehicle, the method comprising:
   determining, by a controller, whether the fuel cell stack is in a state in which a stack performance recovery operation is possible based on information collected from the vehicle using a predetermined stack state determination criterion;
   determining, by the controller, whether the vehicle is in a state in which the stack performance recovery operation is possible based on operation information of the fuel cell system; and
   performing, by the controller, the stack performance recovery operation upon determining that the fuel cell stack is in the state in which the stack performance recovery operation is possible and that the vehicle is in the state in which the stack performance recovery operation is possible,
   wherein the performing the stack performance recovery operation includes sweeping voltage of the fuel cell stack,
   wherein the determining whether the fuel cell stack is in a state in which a stack performance recovery operation is possible comprises:
      determining an integrated value of stack current obtained by integrating current output from the fuel cell stack during operation of the fuel cell system;
      comparing the determined integrated value of stack current with a current integration reference value; and
      determining that the fuel cell stack is in the state in which the stack performance recovery operation is possible, when the determined integrated value of stack current is greater than the current integration reference value, which is the predetermined stack state determination criterion, and
   wherein the determining whether the vehicle is in a state in which the stack performance recovery operation is possible comprises
      determining whether the vehicle is in the state in which the stack performance recovery operation is possible based on a traveling state of the vehicle, a state of charge (SOC) and dischargeable power of a battery connected to a driving motor so as to supply power thereto, and a stack request output.

2. The method of claim 1, wherein the controller integrates only stack current having a predetermined lower limit value or more during the operation of the fuel cell system to determine the integrated value of stack current.

3. A method of recovering performance of a fuel cell stack in a fuel cell system of a vehicle, the method comprising:
   determining, by a controller, whether the fuel cell stack is in a state in which a stack performance recovery operation is possible based on information collected from the vehicle using a predetermined stack state determination criterion;

determining, by the controller, whether the vehicle is in a state in which the stack performance recovery operation is possible based on operation information of the fuel cell system; and performing, by the controller, the stack performance recovery operation upon determining that the fuel cell stack is in the state in which the stack performance recovery operation is possible and that the vehicle is in the state in which the stack performance recovery operation is possible, wherein the performing the stack performance recovery operation includes sweeping voltage of the fuel cell stack, wherein the determining whether the fuel cell stack is in a state in which a stack performance recovery operation is possible comprises:

determining an accumulated traveling distance obtained by accumulating a vehicle traveling distance when output of the fuel cell stack is equal to or greater than a predetermined first output reference value during traveling of the vehicle and operation of the fuel cell system;

comparing the determined accumulated traveling distance with a distance reference value; and determining that the fuel cell stack is in the state in which the stack performance recovery operation is possible, when the determined accumulated traveling distance is greater than the distance reference value, which is the predetermined stack state determination criterion, and wherein the determining whether the vehicle is in a state in which the stack performance recovery operation is possible comprises determining whether the vehicle is in the state in which the stack performance recovery operation is possible based on a traveling state of the vehicle, a state of charge (SOC) and dischargeable power of a battery connected to a driving motor so as to supply power thereto, and a stack request output.

4. A method of recovering performance of a fuel cell stack in a fuel cell system of a vehicle, the method comprising:

determining, by a controller, whether the fuel cell stack is in a state in which a stack performance recovery operation is possible based on information collected from the vehicle using a predetermined stack state determination criterion;

determining, by the controller, whether the vehicle is in a state in which the stack performance recovery operation is possible based on operation information of the fuel cell system; and performing, by the controller, the stack performance recovery operation upon determining that the fuel cell stack is in the state in which the stack performance recovery operation is possible and that the vehicle is in the state in which the stack performance recovery operation is possible, wherein the performing the stack performance recovery operation includes sweeping voltage of the fuel cell stack, wherein the determining whether the fuel cell stack is in a state in which a stack performance recovery operation is possible comprises:

determining an integrated value of stack current obtained by integrating current output from the fuel cell stack and determining an accumulated traveling distance obtained by accumulating a vehicle traveling distance, when output of the fuel cell stack is equal to or greater than a predetermined first output reference value during traveling of the vehicle and operation of the fuel cell system;

comparing the determined integrated value of stack current with a current integration reference value, and comparing the determined accumulated traveling distance with a distance reference value; and determining that the fuel cell stack is in the state in which the stack performance recovery operation is possible, when the determined integrated value of stack current is greater than the current integration reference value or when the determined accumulated traveling distance is greater than the distance reference value, which is the predetermined stack state determination criterion, and wherein the determining whether the vehicle is in a state in which the stack performance recovery operation is possible comprises determining whether the vehicle is in the state in which the stack performance recovery operation is possible based on a traveling state of the vehicle, a state of charge (SOC) and dischargeable power of a battery connected to a driving motor so as to supply power thereto, and a stack request output.

5. The method of claim 1, further comprising:

confirming, by the controller, a number of occurrences of fuel cell stop entries upon determining that the fuel cell stack is in the state in which the stack performance recovery operation is possible; and determining, by the controller, whether the vehicle is in the state in which the stack performance recovery operation is possible upon determining that a predetermined condition related to the confirming a number of occurrences of fuel cell stop entries is satisfied during operation of the fuel cell system, the confirming a number of occurrences of fuel cell stop entries comprises:

determining whether a number of times, where a stack voltage when a fuel cell stop occurs within a predetermined time during the operation of the fuel cell system is equal to or less than a predetermined voltage reference value, is less than a predetermined first number of times; and determining that the predetermined condition related to the confirming a number of occurrences of fuel cell stop entries is satisfied when the number of times, where said stack voltage is equal to or less than the voltage reference value, is less than the first number of times.

6. The method of claim 1, wherein in conditions in which the vehicle is in the traveling state, the SOC of the battery is equal to or greater than a predetermined first SOC reference value, the dischargeable power of the battery is equal to or greater than a predetermined first power reference value, and the stack request output is less than a predetermined second output reference value, the controller determines that the vehicle is in the state in which the stack performance recovery operation is possible.

7. The method of claim 1, wherein
in a condition in which the SOC of the battery is equal to or greater than a predetermined second SOC reference value when the vehicle is in a key off state and is not in the traveling state,
the controller determines that the vehicle is in the state in which the stack performance recovery operation is possible.

8. The method of claim 1, wherein the performing the stack performance recovery operation comprises:
switching a traveling mode of the vehicle to a battery traveling mode in which a driving motor is driven using charged power of a battery such that the vehicle travels;
turning off a main relay; and
controlling operation of an electric load device connected to the fuel cell stack to sweep the voltage of the fuel cell stack in order to recover performance of the fuel cell stack.

9. The method of claim 8, wherein the electric load device comprises:
a COD heater configured to heat a stack coolant; and
an air compressor configured to supply air, which is used as oxidizing gas, to the fuel cell stack.

10. The method of claim 9, wherein
during the stack performance recovery operation,
the controller turns on the COD heater and performs a cooling control of the COD heater using the stack coolant, to sweep the voltage of the fuel cell stack in order to recover performance of the fuel cell stack, and performs an on/off control of the air compressor in which the air compressor is controlled to be alternately on and off.

11. The method of claim 1, further comprising:
determining, by the controller, whether a predetermined stack performance recovery operation interruption condition is satisfied during the stack performance recovery operation;
determining, by the controller, whether the stack performance recovery operation has been completed upon determining that the stack performance recovery operation interruption condition is satisfied; and
changing, by the controller, the predetermined stack state determination criterion and finishing the stack performance recovery operation upon determining that the stack performance recovery operation has not been completed,
wherein the determining whether a predetermined stack performance recovery operation interruption condition is satisfied comprises
determining that the stack performance recovery operation interruption condition is satisfied when at least one of a condition in which a stack request output is less than a predetermined third output reference value, a condition in which a state of charge (SOC) of a battery connected to a driving motor so as to supply power thereto is less than a predetermined third SOC reference value, or a condition in which dischargeable power of the battery is less than a second power reference value is satisfied during the stack performance recovery operation.

12. The method of claim 11, wherein
in a case in which a number of times of on/off control of an air compressor configured to sweep voltage of the fuel cell stack is less than a predetermined second number of times during the stack performance recovery operation,
the controller determines that the stack performance recovery operation has not been completed.

13. The method of claim 11, wherein
upon determining that the stack performance recovery operation has been completed,
the controller finishes the stack performance recovery operation without changing the predetermined stack state determination criterion.

14. The method of claim 13, wherein
in a case in which a number of times of on/off control of an air compressor configured to sweep voltage of the fuel cell stack has reached a predetermined second number of times during the stack performance recovery operation,
the controller determines that the stack performance recovery operation has been completed.

15. The method of claim 12, further comprising:
determining, by the controller, whether the stack performance recovery operation has been completed upon determining that the stack performance recovery operation interruption condition is not satisfied;
maintaining, by the controller, the stack performance recovery operation upon determining that the stack performance recovery operation has not been completed; and
finishing, by the controller, the stack performance recovery operation upon determining that the stack performance recovery operation has been completed.

16. The method of claim 15, wherein
in a case in which the number of times of the on/off control of the air compressor has reached the predetermined second number of times during the stack performance recovery operation,
the controller determines that the stack performance recovery operation has been completed.

* * * * *